United States Patent [19]

Peerman et al.

[11] 4,423,162

[45] Dec. 27, 1983

[54] POLYURETHANES FROM HYDROXYMETHYL POLYOLS AND POLYISOCYANATES

[75] Inventors: Dwight E. Peerman; Edgar R. Rogier, both of Minnetonka, Minn.

[73] Assignee: Henkel Corporation, Minneapolis, Minn.

[21] Appl. No.: 415,734

[22] Filed: Sep. 7, 1982

[51] Int. Cl.$^3$ .............................................. C12P 7/12
[52] U.S. Cl. .................................. 521/164; 521/85; 521/159; 521/172
[58] Field of Search ................ 521/85, 159, 164, 172

[56] References Cited

U.S. PATENT DOCUMENTS

| | | | |
|---|---|---|---|
| 3,957,753 | 5/1976 | Hostettler et al. | 521/172 X |
| 4,065,410 | 12/1977 | Schäfer et al. | 521/164 X |
| 4,243,818 | 1/1981 | Rogier | 560/224 |
| 4,348,543 | 9/1982 | Rogier | 568/823 |
| 4,359,542 | 11/1982 | Chandalia et al. | 521/164 X |

*Primary Examiner*—Lucille M. Phynes
*Attorney, Agent, or Firm*—Bacon & Thomas

[57] ABSTRACT

Polyurethanes prepared from the reaction of hydroxymethyl polyols and polyisocyanates are disclosed.

56 Claims, No Drawings

POLYURETHANES FROM HYDROXYMETHYL POLYOLS AND POLYISOCYANATES

CROSS REFERENCE TO RELATED APPLICATION

This application discloses material which is also disclosed in co-pending application Ser. No. 415,718, filed concurrently with this application by the same inventors.

BACKGROUND OF THE INVENTION

1. Field of the Invention

This invention is directed to polyurethanes prepared from hydroxymethyl polyols and polyisocyanates.

2. Description of the Art Practices

It is known that polyurethanes can be produced by reaction of polyisocyanates and polyols. The polyols for the reaction may be formulated from many materials. For instance the work of Hostettler, and Hostettler et al in U.S. Pat. No. 2,933,477 issued Apr. 19, 1960, U.S. Pat. No. 2,962,524 issued Nov. 29, 1960, and U.S. Pat. No. 2,962,455 issued Nov. 29, 1960, teaches that caprolactone may be utilized to form polyols which are then useful in the formation of other materials such as urethanes. However, the Hostettler, and Hostettler et al materials are solids and thus are of limited utility because they must be heated above their melting point in order to be capable of reacting effectively with other materials.

It is known from U.S. Pat. No. 2,599,468 issued June 3, 1952 to McKeever that 9(10)hydroxymethyloctadecanol may be prepared. This material is normally a solid although it is sometimes found as a super cooled liquid. While this material might be useful for several purposes it is expensive to obtain in that the normal route of processing is from oleic acid. That is, while the hydroxymethyl formation through the oxo process may be conducted relatively simply on this material, there is difficulty and expense involved in converting the carboxylic group to an alcohol. DeWitt et al in U.S. Pat. No. 3,242,414 issued Mar. 29, 1966 discloses that electrically resistant materials may be formed from the alcohols described in the aforementioned McKeever patent. It is known that acrylic esters of the materials of McKeever may be formulated through the disclosures of Offenlegungsschrift No. 2,200,021 published July 26, 1973 by Wegemund. It is also known from U.S. Pat. No. 3,043,871 to Buchner et al issued July 10, 1962 that the diacid corresponding to the alcohol of McKeever may be formed.

The work of the United States Department of Agriculture at the Northern Regional Laboratory at Peoria, Ill., has lead to the conversion number of unsaturated fatty compounds which may be further converted to useful materials. For instance, in U.S. Pat. No. 3,787,459 issued Jan. 22, 1974 to Frankel there is disclosed formyl derivatives of carboxylic acids. In U.S. Pat. No. 3,928,231 issued Dec. 23, 1975 to Frankel there is also disclosed the formation of polycarboxylic acids derived from fatty materials. In U.S. Pat. No. 4,093,637 issued June 6, 1978 to Miller the use of esters of fatty derived materials as polyvinylchloride plasticizers is disclosed. Esters of materials containing hydroxyl groups are described in U.S. Pat. No. 4,083,816 issued Apr. 11, 1978 to Frankel et al.

There are further disclosures of materials by the United States Department of Agriculture in a paper entitled Carboxystearic Acid Esterification and Interchanges dated Nov. 11, 1971 by Dufek et al. A second publication of Dufek et al entitled Some Esters of Mono- Di- and Tricarboxystearic Acid as Plasticizers; Preparation and Evaluation, Volume 53 JAOCS, p. 198, May 1976 discusses the uses of polycarboxylate esters. The formation of a hydroxymethyl triglyceride product by hydroformylation and hydrogenation of oleic safflower oil is referred to by Frankel et al in JAOCS Vol. 48, No. 5, p. 248 entitled Methyl 9(10)-Formylstearate by Selective Hydroformylation of Oleic Oils. Hydroxymethyl fatty alcohols are also described in the work of Frankel et al in JAOCS Vol. 52, 12, p. 498, 1975, entitled Acyl Esters of Oxo-Derived Hydroxymethylstearates as Plasticizers for Polyvinyl Chloride.

The disclosures of the foregoing references, to the extent that they are applicable to the present invention, are hereby incorporated by reference.

SUMMARY OF THE INVENTION

The subject invention is based upon the discovery that useful polyurethanes can be prepared from polyols formulated from fatty oils. These polyurethanes have properties which make them attractive as elastomers, coatings and adhesives.

The polyurethanes of the invention are produced by the reaction of at least one non-gelled hydroxymethyl polyol of the formula:

$$R-X-A-H]_p$$

where
R is a polyol, polyamine or aminoalcohol residue;
X is O, N, or NH; 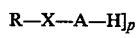
p is an integer from 2 to 6; and,
A, which may be the same or different, is selected from the group consisting of $A_1$, $A_2$, and $A_3$ and combinations of $A_1$, $A_2$ and $A_3$,
where

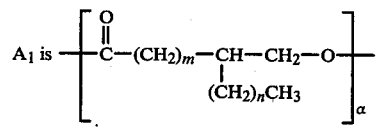

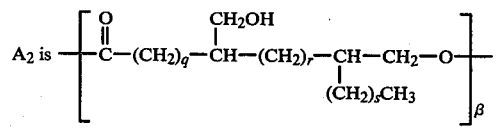

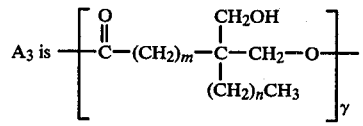

where m, n, q, r, s, $\alpha$, $\beta$ and $\gamma$ are integers such that m is greater than 3, n is greater than or equal to zero, and the sum of m and n is from 11 to 19, inclusive; q is greater than 3, r and s are each greater than or equal to zero and the sum of q, r and s is from 10 to 18, inclusive; $\alpha$, $\beta$ and $\gamma$ are each from 0 to 10, inclusive, all $\alpha$'s, $\beta$'s and $\gamma$'s are not zero, and at least one polyisocyanate.

DETAILED DESCRIPTION OF THE INVENTION

The hydroxymethyl polyol component of the reaction which produces polyurethanes of the invention are prepared by a reaction of an A-B type hydroxy ester monomer such as methyl 9(10)-hydroxymethyloctadecanoate and a multifunctional compound having at least two active hydrogens of the type $R(OH)_p$, i.e., a polyol or $R(NH_2)_p$ or $R(NH)_p$, i.e., a polyamine, R representing the residual proportion of the compound and p is as defined previously. The active hydrogens can also be present in compounds having both hydroxyl and amine groups, e.g., aminoalcohols. Such polyols are the subject of co-pending application Ser. No. 415,718, filed concurrently with this application by the same inventors.

The reaction which produces these polyols can be represented by the following equation, using a polyol as the source of active hydrogens:

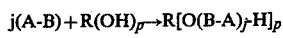

If A-B represents a hydroxyester, HO-R''-CO$_2$R''', then the reaction becomes

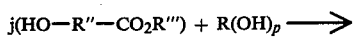

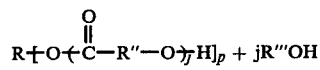

The resulting multichain polyester polyols are composed of p chains and thus have a hydroxyl functionality of p which corresponds exactly with the functionality of the starting polyol $R(OH)_p$. Cross-linking is precluded since the terminal hydroxyl groups do not react with themselves under the reaction conditions. The average length j of the chains is controlled by the relative proportion of the hydroxy ester monomer to the multifunctional reactant and the extent of the condensation, which is generally carried to completion.

The reaction mechanism is the same when polyamines or aminoalcohols are employed as the sources of active hydrogens. Polyamines containing primary and secondary amines as well as combinations of primary and secondary amines function effectively to produce amide polyols.

The hydroxy ester monomer starting material is prepared by hydrogenation of hydroformylated unsaturated carboxylic acids or esters. The starting unsaturated acids are obtained most conveniently by splitting a triglyceride into its respective component fatty acids. Sources of fatty acids include fatty oils such as tallow and most plant sources particularly soybean, sesame, sunflower, tall oil and other similar materials. For the purposes of processing, the starting fatty acids are conveniently obtained in the form of the methyl ester.

The introduction of the hydroxymethyl group can be readily accomplished by a hydroformylation process utilizing either cobalt or rhodium catalysts, followed by hydrogenation of the formyl group to obtain the hydroxymethyl group by catalytic methods or by chemical reduction. This procedure is described in detail in U.S. Pat. Nos. 4,216,343, 4,216,344, 4,304,945, and 4,229,562 of Rogier and references discussed therein and, to the extent necessary to the understanding of the subject invention, each of these patents and references is hereby incorporated by reference.

When a mono-unsaturated fatty acid ester is used as the starting material a mono-hydroxymethyl ester of the following formula is obtained (using the methyl ester as an example):

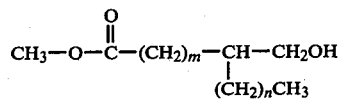

For most of the commonly available mono-unsaturated fatty acids, m>3 and n is a value such that the sum of m and n is between 11 and 19. Thus, for example, the product obtained when the methyl ester of oleic acid is the starting material is 9(10) methyl hydroxymethyloctadecanoate of the formula:

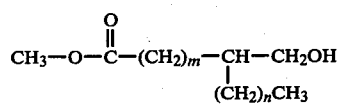

where
m is 8 or 7, and
m is 7 or 8.

The designation 9(10) in the name of this compound and the alternative designations for m and n in the formula indicate that the product is, in fact, a mixture of the 9 and 10 isomers with respect to the hydroxymethyl group, as a result of the alternative positioning of the formyl group in the hydroformylation process.

When a di-unsaturated fatty acid ester is selected as the starting material, a di-hydroxymethyl ester of the following formula is obtained via the rhodium catalyzed hydroformylation process (again using the methyl ester as an example):

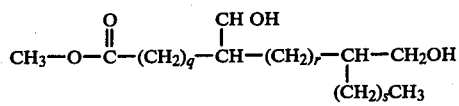

For most commonly available di-unsaturated fatty acids, q will be >3, r and s will be zero or greater, and the sum of q, r and s will be between 10 and 18, inclusive.

Thus, for example, if 9,12-linoleic acid ester is the starting material, the formylated ester will be a 9(10), 12(13) diformyloctadecanoate, that is, a mixture of the 9-12, 9-13, 10-12, 10-13 diformyl esters. When this mixture is hydrogenated the corresponding dihydroxymethyloctadecanoates will be obtained.

A tri-unsaturated starting material will partially reduce giving a mixture of isomers. Without discussing all the particular isomers present when 9,12,15-linolenic acid ester is employed, the product will be a diformyl mixture of the 9(10), 12(13), and 15(16) isomers.

The hydroxymethyl monomer can also be prepared as a gem-bis(hydroxymethyl) ester of the formula (again using the methyl ester as an example):

$$CH_3-O-\overset{O}{\underset{\|}{C}}-(CH_2)_m-\underset{(CH_2)_nCH_3}{\overset{CH_2OH}{\underset{|}{C}}}-CH_2OH$$

where m and n are as previously defined.

The preparation of these gem-bis(hydroxymethyl) compounds follows the procedure disclosed in U.S. Pat. No. 4,307,224 to Rogier, except that unsaturated esters as opposed to the unsaturated alcohol analogs are used as the starting material. Accordingly, to the extent necessary for the understanding of the subject invention, the disclosure of the foregoing patent is hereby incorporated by reference.

The multifunctional compounds containing at least two active hydrogens which are reacted with the hydroxymethyl compounds to obtain hydroxymethyl polyol reactants for the invention, may be generically identified by the formula:

$$R(XH)_p$$

where

X is O, N, or NH, and p is 2 to 6.

In this formula, X may be the same in each moiety p or may differ in one or more moieties. The formula, therefore, encompasses polyols, polyamines containing primary and secondary amines and combinations of primary and secondary amines and aminoalcohols, i.e., compounds containing both hydroxy and amino groups. The component R then represents the residual portion of the compound. In this regard, it should be understood that when X represents N, so that the compound contains a secondary amino group, R represents both portions of the residual compound attached to the secondary amino group.

Polyols useful as the multifunctional compound include diols, triols, tetrols and even higher polyols. The choice of the polyol will depend upon the functionality desired in the product polyol of the invention.

Exemplary of useful diols include such materials as ethylene glycol, neopentylglycol, diols of the formula:

$$H(CH_2)_hCH(CH_2OH)(CH_2)_kCH_2OH$$

where k is >3; and h+k are non-zero integers, the sum of which is from 12 through 20.

An example of such material is 9(10)-hydroxymethyloctadecanol. Additional diol materials which may be used in the present invention include 1,4-bishydroxymethylcyclohexane. Further diol materials include a compound of the formula:

$$R_4-CH\underset{\underset{R_3}{\diagdown}\underset{}{CH}-\underset{R_2}{\underset{\diagup}{CH}}}{\overset{\overset{CH_2-CH_2}{\diagup\diagdown}}{\diagdown}}CH-R_1$$

wherein $R_1$, $R_2$, $R_3$ and $R_4$ have a total of from 30 to 38 carbon atoms and are each straight-chained alkyl groups having at least 5 carbon atoms, and wherein two of these alkyl groups have omega-hydroxyl substituents. Such later described materials are described in British Pat. No. 1,043,507.

Further useful diols which may be utilized in the present invention include compounds of the formula:

(IA)

(HOCH$_2$)$_2$ and (IB)

(HOCH$_2$)$_2$ and mixtures thereof.

Specific compounds within the scope of the foregoing formulas are 8,8-bis(hydroxymethyl)-tricyclo[5,2,1,0$^{2,6}$]decane and 8,8(9,9)-bis(hydroxymethyl)tricyclo[5,2,1,0$^{2,6}$]decene.

Still further diol materials which may be used in the present invention include 2,5-hexanediol; 1,6-hexanediol; Dimerol alcohol, a 36 carbon diol available from the Henkel Corporation; 1,4-cyclohexane diol; Polybd R-45HT, a butadiene diol having an approximate molecular weight of 2800; hydrogenated bisphenol A, and other similar materials. An additional diol which may be employed is the diol which is a member selected from the group consisting of 3(4),8(9)-(bishydroxymethyl)tricyclo[5,2,1,0$^{2,6}$]decane.

Suitable triol materials include trimethylol propane and the triols disclosed in U.S. Pat. No. 4,216,344 to Rogier. However, in some instances the presence of secondary hydroxyl groups can cause problems in the properties of the molecules such as sweating wherein the product appears to be wet and not fully cured. Therefore, as a practical matter, triols should contain no secondary hydroxyl groups and/or should preferably contain more than 3 carbon atoms so that any secondary hydroxyl group is not hindered by the close positioning of the primary hydroxyl groups within the molecule.

Further triols useful in the present invention include the triols described by Rogier in U.S. Pat. No. 4,216,344. A suitable example of such materials includes 9,9(10,10)-bishydroxymethyloctadecanol.

It is further noted that it is possible to use triols in combinations with other polyols, a particularly valuable blend being that found described by Rogier in U.S. Pat. No. 4,243,818. Additional examples of triols which may be employed include 1,2,6-hexanetriol and other similar materials.

Tetrols include such materials as pentaerythritol. Higher polyols include those pentols described in U.S. Pat. No. 4,216,344 issued to Rogier.

Further polyols which are useful include materials from the work of Rogier in U.S. patent application, Ser. No. 233,793, filed Feb. 12, 1981, now U.S. Pat. No. 4,348,543. Such compounds are shown below:

I $$CH_3(CH_2)_x\underset{R_1\ R_3\ \ R_2\ R_4}{-}(CH_2)_yCH_2OH$$

and

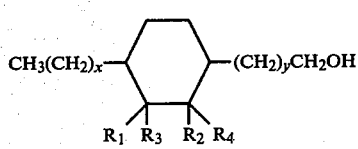

and mixtures thereof wherein $R_1$ and $R_2$ are selected from the group consisting of hydrogen and methyl and mixtures thereof with the provision that one such member must be hydrogen; and $R_3$ and $R_4$ are hydrogen or hydroxymethyl provided that at least one of $R_3$ and $R_4$ must be hydroxymethyl, and further that x is an integer of from 3 through 6 and y is an integer from 6 through 9 and that the sum x+y is 12.

Polyols for use in preparing the hydroxymethyl polyol reactants of the invention also include ester linked polyols and ether linked polyols such as tetramethylene glycol ethers. Similarly, diethylene glycol may be employed. It is also possible to use compounds containing both ester and ether linkages within the molecule, provided that at least two hydroxyl radicals remain. A preferred group of polyols within this class of linked polyols are those prepared by condensing a polyol with at least one mole of alkylene oxide per mole of hydroxyl on the polyol, according to the reaction (using ethylene oxide for illustration):

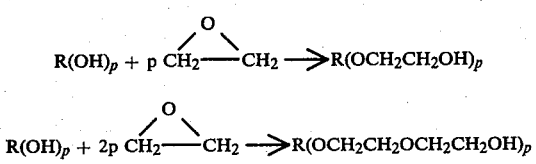

While ethylene oxide is the preferred alkoxylating agent for preparing ether polyols, other alkylene oxides, notably propylene oxide, may be used as well as mixtures of alkylene oxides, most notably mixtures of ethylene and propylene oxides.

Polyamine compounds which are useful in preparing amide hydroxymethyl polyol reactants for the invention may contain primary and secondary amine groups and combinations thereof provided that there are at least two amino groups. They may be linear or branched chain, cyclic or aromatic in structure. Such compounds include, but are not limited to, diamines such as ethylene diamine, neopentyldiamine, 1,6-diaminohexane, bis-aminomethyltricyclodecane, bis-aminocyclohexane; triamines such as diethylene triamine; and tetramines such as triethylene tetramine.

Exemplary aminoalcohols which are useful in preparing hydroxymethyl polyol reactants for the invention are ethanolamine, diethanolamine and triethanolamine.

As discussed previously, the hydroxymethyl polyol reactants of the invention are prepared by a transesterification reaction. The starting materials comprising the hydroxymethyl ester monomer and the multifunctional compound, i.e., polyol, polyamine or aminoalcohol, are mixed together in proportions which are selected to achieve the desired hydroxymethyl polyol product. Mixtures of different multifunctional reactants as well as mixtures of different hydroxymethyl ester monomers may be used as the starting materials for the reaction. Mixed hydroxymethyl esters generally occur when the starting material is derived from naturally occurring fatty oils.

The temperature of the reaction mixture is gradually raised until an alkanol is generated. The particular alkanol produced will depend upon the alkyl moiety of the ester group. Thus, when the hydroxymethyl ester reactant is a methyl ester, methanol is generated. The alkanol is preferably drawn off from the reaction mixture to encourage a substantially complete reaction. Ideally, no more than a minor amount of the starting hydroxymethyl ester should remain in the end product as this material is mono-functional in reactions with polyisocyanates, and therefore acts as a chain terminating agent in the reaction to form polyurethanes. These polyols are referred to as hydroxymethyl polyols since each hydroxyl group in the polyol exists as part of a hydroxymethyl moiety.

The optimum reaction temperature to produce the hydroxymethyl polyol reactants for the invention will vary depending upon the catalyst selected for the reaction, if any, and the reactivity of the reactants. Generally, reactions employing polyols as the multifunctional reactant are enhanced by the use of catalysts such as dibutyl tin oxide, butyltin tris(2-ethylhexoate), butylchlorotin dihydroxide, tetrabutyl orthotitanate, calcium acetate/antimony oxide and base catalysts such as sodium methoxide. Reactions involving polyamines as the multifunctional reactant do not generally require catalysts.

In the preparation of the hydroxymethyl polyol reactants, it is important to avoid gellation, i.e., formation products of infinitely high viscosity and insolubility in all nondegrading solvents. Gellation can be avoided by limiting the extent of conversion or generally more preferably by using quantities of reactants far from the amounts required stoichiometrically. For a discussion of gellation see Flory, "Principles of Polymer Chemistry", Cornell University Press, 1953, p. 47, 347.

In preparing polyurethanes according to the invention, the hydroxymethyl polyol reactant is reacted with polyisocyanates. Suitable polyisocyanates include ethylene diisocyanate, trimethylene diisocyanate, hexamethylene diisocyanate, propylene-1, 2-diisocyanate, ethylidene diisocyanate, cyclopentylene-1, 3-diisocyanate, the 1,2-, 1,3- and 1,4-cyclohexylene diisocyanates, the 1,3- and 1,4-phenylene diisocyanates, diphenylmethane diisocyanates, polymethyleneisocyanates, the 2,4- and 2,6-toluene diisocyanates, the 1,3- and 1,4-xylylene diisocyanates, bis(4-isocyanatoethyl) carbonate, 1,8-diisocyanato-p-methane, 1-methyl-2, 4-diisocyanatocyclohexane, the chlorophenylene diisocyanates, naphthalene-1,5-diisocyanate triphenylmethane-4,4', triisocyanate, isopropylbenzene-alpha-4-diisocyanate, 5,6-bicyclo[2.2.1] hept-2-ene diisocyanate, 5,6-diisocyanatobutylbicyclo [2.2.1] hept-2-ene and similar polyisocyanates.

Of particular interest in the present invention are trimethylhexamethylene diisocyanate available from VEBA, heptadecyl (C17) diisocyanate, DDI 1410 an aliphatic C-36 diisocyanate available from the Henkel Corporation of Minneapolis, Minn. (generally such diisoscyanates having from 12 to 40 carbons in the aliphatic radical may be used in the present invention) and Isonate 143L diisocyanate, a modified diphenylmethane diisocyanate (MDI) available from Upjohn Corp. Further urethane components are isophorone diisocyanate available from VEBA and Desmodur N an aliphatic triisocyanate available from Mobay. Desmodur N is more particularly defined as the reaction product of 3 moles of hexamethylene diisocyanate and water having an isocyanate equivalent weight as later defined of 191. Other adducts or prepolymers of the polyisocyanate include Desmodur L and Mondur CB which are the adducts of toluene diisocyanate. The foregoing materials have an isocyanate equivalent weight of approximately 250.

The amount of the polyisocyanate utilized in forming the urethane compositions of the present invention is expressed on a percentage equivalent weight basis with respect to the hydroxyl functionality of the hydroxymethyl polyol. Desirably, each hydroxy functional group on the polyol will react on a 1:1 stoichiometric basis with the isocyanate functionality of the polyisocyanate compound. It is quite feasible, however, to form the urethane linkage using from about 80% to 120% preferably from about 95% to 105% on a hydroxyl-isocyanate equivalent basis of the polyisocyanate to form the urethane product. The determination of the amount of polyisocyanate required for a given hydroxymethyl polyol reactant is readily made using hydroxyl or isocyanate equivalent weights as is well known to those of skill in the art. Mixtures of polyisocyanates and hydroxymethyl polyols may also be used in accordance with these parameters.

Cross-linked polyurethanes are obtained whenever the hydroxyl functionality of the polyol reactant is greater than 2.0. Otherwise, thermoplastic polyurethanes are obtained.

To form the urethane reaction product, the hydroxymethyl polyol and the organic polyisocyanate reactants are mixed together in the proper proportions. When utilized as a coating the compounds are then quickly spread with a knife blade, brush or spray over the surface of the article to be coated. Where molded articles are desired various techniques such as casting, injection molding, reaction injection molding may be employed.

If desired, various urethane catalysts may be employed to promote the reaction. Examples of such urethane catalysts include triethylene diamine, N-ethyl-morpholine, dimethyl piperazine, triethylamine, N,N,N',N'-tetramethylbutane-1,3-diamine, dibutyltin dilaurate, stannous octoate, stannous oleate, and stannous tallate, as well as other art recognized urethane catalysts. Typical levels of the urethane catalyst are from about 0.001% to about 5% by weight of the urethane components.

Trimerization catalysts such as diethylene diamine and $BF_3$ derivatives, can be included in the reaction mixture to convert the polyisocyanates to polyisocyanurates in situ and then to polyurethanes.

One or more additional polyols may be included in the reaction mixture to modify the properties of the resulting polyurethane, principally hardness and elasticity. Short chain polyols act as hard segment contributors to increase elastomer hardness while long chain polyols act as soft segment contributors to enhance the elastic properties of the elastomer. Such modifying polyols include alkyl or cycloalkyl polyols, ester linked polyols, ether linked polyols, ether and ester linked polyols and hydroxy functional acrylic copolymers.

Specific examples of the alkyl and cycloalkyl polyols include 2,5-hexanediol, 1,6-hexanediol, ethylene glycol, glycerol, 1,2,6-hexanetriol, pentaerythritol, 1,4-cyclohexane diol, and 1,4-butanediol.

Examples of ester linked saturated polyols include Niax PCP0200 and PCP0240 both available from Union Carbide and having respective molecular weights of approximately 530 and 2000. Both of the foregoing compounds are diols. Niax PCP0300 also available from Union Carbide is a caprolactone-ester triol having an approximate molecular weight of 540. Niax PCP0310 also available from Union Carbide is a caprolactone ester triol having a molecular weight of approximately 900.

The ether linked saturated polyols include compounds such as diethylene glycol and triethylene glycol both available from Fisher. Other ether linked saturated polyols include Teracol 1000 and 2000, available from Dupont. Further ether linked saturated polyols useful in the present invention include the Polymeg Q0650, Q0100, and Q0200 all of which are ether diols available from Quaker having a respective molecular weight of approximately 650, 1000 and 2000. Pluracol P1010 having an approximate molecular weight of 1050 available from Wyandotte is an example of polypropylene oxide ether linked diol useful in the present invention. Similar Wyandotte products useful as saturated polyols in the present invention include Pluracol TP440 and 150 which are propylene oxide ether linked triols having respective molecular weights of approximately 425 and 1560. In similar fashion Pluracol GP3030 is another saturated polyol suitable for the present invention available from Wyandotte. The foregoing material is a glycerine polypropylene ether linked triol having an approximate molecular weight of 2900.

Additional Pluracols useful in the present invention include Pluracol PEP450 which is a pentaerythritol polypropylene oxide ether linked tetrol having a molecular weight of 405 and Pluracol 493 an ether linked tetrol having a molecular weight of approximately 3630.

In addition, polyols having hydroxyl functionalities greater than 2.0 may be included in the reaction mixture as cross-linking agents. Suitable polyols for this purpose are disclosed in U.S. Pat. No. 4,216,344, issued Aug. 5, 1980 to Rogier. Additional materials which may be used as cross-linking agents are found in the application of Rogier, Ser. No. 233,793, filed Feb. 12, 1981.

Numerous other modifying agents may be added to the polyurethanes of the invention to adapt the elastomer to particular uses. Thus, fillers such as carbon blacks, zinc oxide, titanium oxide and the like can be added. Plasticizers and dyes are other examples of suitable modifying agents.

Because many of the hydroxymethyl polyol and polyisocyanate reactants are liquid, additional heating is only required where lower viscosity for efficient mixing is desired. For convenience the reactants may be heated to the temperature of reaction typically from about 0° to about 110° C., preferably from about room temperature, i.e., 22° C. to about 85° C. The system is operated under a high vacuum to degas the reaction mixture for about 15 minutes. The reaction mixture is then cured for a time period of from about one to twenty-four hours depending upon the curing temperature and the particular polyurethane formed. Optimum curing cycles can be readily determined without undue experimentation by those of skill in the art.

Polyurethanes of the invention may also be prepared as isocyanate terminated pre-polymers by conducting the reaction with a substantial excess of polyisocyanate and not curing the reaction mixture. The pre-polymer provides an intermediate form of the polyurethane which is more convenient to handle than the individual reactants. By mixing the pre-polymers with additional polyol and curing, the pre-polymer is converted to a polyurethane resin.

Pre-polymers are particularly useful in making microcellular foam. The pre-polymer is mixed with polyol and a blowing agent and then poured into a mold which is heated to form microcellular polyurethane foam.

Polyurethanes prepared in accordance with the invention exhibit low water absorption, good retention of strength after exposure to hot water and good flexibility. They have utility in a wide range of applications as elastomers, foams, protective coatings and adhesives. In addition, because one of the two principal reactants can be derived from naturally occurring fatty oils, the manufacturing process is efficient and economical.

To further illustrate various aspects of the invention, the following Examples are provided. However, it is to be understood that these Examples are purely illustrative and are in no way intended to limit the scope of the invention.

EXAMPLE 1

To 740 grams, 2.2 moles, of 9(10)-methylhydroxymethyloctadecanoate (referred to hereinafter as $C_{19}HME$) were added 97.5 grams, 1.1 moles, of 1,4 butanediol. These reactants were heated to 85° C. and a vacuum of 0.5 mm Hg was applied to degas the polyols. The vacuum was released after 30 minutes with nitrogen and 0.05 grams of tetrabutyl orthotitanate (9 ppm Ti) was added. Heat was gradually applied until methanol began to evolve at 167° C. Heating was continued at 170°–180° C. for 4 hours, 200° C. for 3 hours. At this point analysis by gas chromatography indicated that less than 1% unreacted $C_{19}HME$ remained based on the weight of the sample taken. Methanol remaining in the reaction was removed under vacuum at 85° C., stripping for about 50 minutes.

The equivalent weight of the resultant polyester polyol by hydroxyl analysis was 368 and the viscosity was 11.3 poise at 23° C.

EXAMPLE 2

To 660 grams, 1.97 moles, of $C_{19}HME$ were added 62 grams, 1.0 mole, of ethylene glycol, and 0.12 grams of butyltin tris(2-ethylhexoate) (35 ppm Sn) was added. Heat was gradually applied until methanol began to evolve at 204° C. Heating was continued at 204° C. for 4 hours, 215° C. for 1½ hours. At this point analysis by gas chromatography indicated that very little unreacted $C_{19}HME$ remained based on the weight of the sample taken. Methanol remaining in the reaction was removed under vacuum, stripping for about 50 minutes.

The equivalent weight of the resultant polyester polyol by hydroxyl analysis was 446 and the viscosity was 14.0 poise at 23° C.

EXAMPLE 3

To 205 grams, 0.6 mole, of $C_{19}HME$ were added 119 grams, 0.6 mole, of bishydroxymethyl tricyclodecane. These reactants were heated to 140° C. and a vacuum of 0.5 mm Hg was applied to degas the polyols. The vacuum was released after 15 minutes with nitrogen and 0.04 grams of butyltin tris(2-ethylhexoate) (24 ppm Sn) was added. Heat was gradually applied until methanol began to evolve at 186° C. Heating was continued at 200° C. for 8½ hours. At this point analysis by gas chromatography indicated that less than 1% unreacted $C_{19}HME$ remained based on the weight of the sample taken. Methanol remaining in the reaction was removed under vacuum at 180° C., stripping for about 35 minutes.

The equivalent weight of the resultant polyester polyol by hydroxyl analysis was 260 and the viscosity was 81.4 poise at 23° C.

EXAMPLE 4

To 205 grams, 0.6 mole, of $C_{19}HME$ were added 182.4 grams, 0.6 mole, of 9(10)-hydroxymethyloctadecanol (hereinafter referred to as $C_{19}Diol$). These reactants were heated up to 100° C. and a vacuum of 0.5 mm Hg was applied to degas the polyols. The vacuum was released after 30 minutes with nitrogen and 0.06 grams of butyltin tris(2-ethylhexoate) (30 ppm Sn) was added. Heat was gradually applied until methanol began to evolve at 200° C. Heating was continued at 200° C. for 5 hours. At this point analysis by gas chromatography indicated that less than 1% unreacted $C_{19}HME$ remained, based on the weight of the sample taken. Methanol remaining in the reaction was removed under vacuum at 100° C., stripping for about 30 minutes.

The equivalent weight of the resultant polyester polyol by hydroxyl analysis was 307 and the viscosity was 12.2 poise at 23° C.

EXAMPLE 5

To 409.8 grams, 1.2 moles, of $C_{19}HME$ are added 136.8 grams, 0.4 mole, of 9,9(10,10)-bis(hydroxymethyl)octadecanol (hereinafter referred to as $C_{20}Triol$). These reactants were heated 90°–130° C. and a vacuum of 0.5 mm Hg was applied to degas the polyols. The vacuum was released after 60 minutes with nitrogen and 0.08 grams of butyltin tris(2-ethylhexoate) (30 ppm Sn) was added. Heat was gradually applied until methanol began to evolve at 200° C. Heating was continued at 210° C. for 5 hours. At this point analysis by gas chromatography indicated that very little unreacted $C_{19}HME$ remained, based on the weight of the sample taken. Methanol remaining in the reaction was removed under vacuum at 70°–80° C., stripping for about 50 minutes.

The equivalent weight of the resultant polyester polyol by hydroxyl analysis was 429 and the viscosity was 30.7 poise at 23° C.

EXAMPLE 6

To 286.9 grams, 0.8 mole, of $C_{19}HME$ were added 119.8 grams, 0.8 mole, of trimethylol propane, and 0.06 grams of butyltin tris(2-ethylhexoate) (31 ppm Sn) was added. Heat was gradually applied until methanol began to evolve at 205° C. Heating was continued at 212°–228° C. for 5 hours. Methanol remaining in the reaction was removed under vacuum at 210° down to 70° C. for about 115 minutes.

The equivalent weight of the resultant polyester polyol by hydroxyl analysis was 151 and the viscosity was 28.9 poise at 23° C.

EXAMPLE 7

To 322.7 grams, 0.9 mole, of $C_{19}HME$ were added 122.6 grams, 0.9 mole, of pentaerythritol, and 0.05 grams of butyl tin tris(2-ethylhexoate) (27 ppm Sn) was added. Heat was gradually applied until methanol began to evolve at 215° C. Heating was continued at 230°–250° C. for 5 hours. Methanol remaining in the reaction was removed under vacuum at 150° C., stripping for about 120 minutes.

The equivalent weight of the resultant polyester polyol by hydroxyl analysis was 219.3 and the viscosity was 46.6 poise at 23° C.

EXAMPLE 8

To 322.7 grams, 0.9 mole, of $C_{19}HME$ were added 61.3 grams, 0.45 mole, of pentaerythritol, and 0.05 grams of butyltin tris(2-ethylhexoate) (32 ppm Sn) was added. Heat was gradually applied until methanol began to evolve at 220° C. Heating was continued at 220°–245° C. for $3\frac{1}{4}$ hours. Methanol remaining in the reaction was removed under vacuum for about 120 minutes. The product was stripped to remove solids.

The equivalent weight of the resultant polyester polyol by hydroxyl analysis was 294.7 and the viscosity was 36.2 poise at 23° C.

EXAMPLE 9

To 358.6 grams, 1.0 mole, of $C_{19}HME$ were added 45.4 grams, 0.33 mole, of pentaerythritol, and 0.05 grams of butyltin tris(2-ethylhexoate) (31 ppm Sn) was added. Heat was gradually applied until methanol began to evolve at 250° C. Heating was continued at 250°–260° C. for $2\frac{1}{2}$ hours. Methanol remaining in the reaction was removed under vacuum, stripping for about 120 minutes, and cooling from this reaction temperature. The product was filtered to remove solids.

The equivalent weight of the resultant polyester polyol by hydroxyl analysis was 366.7 and the viscosity was 22.9 poise at 23° C.

EXAMPLE 10

To 683.0 grams, 2.0 moles, of $C_{19}HME$ were added 68.0 grams, 0.5 mole, of pentaerythritol, and 0.12 grams of butyltin tris(2-ethylhexoate) (33 ppm Sn) was added. Heat was gradually applied until methanol began to evolve at 200° C. Heating was continued at 200°–220° C. for 5 hours plus 235°–255° C. for 7 hours. No methanol remained because of this high reaction temperature. The product was filtered to remove solid material.

The equivalent weight of the resultant polyester polyol by hydroxyl analysis was 442.1 and the viscosity was 45.3 poise at 23° C.

EXAMPLE 11

The polyunsaturated methyl esters from sunflower fatty acids were hydroformylated and reduced to produce a product with about 70% methyl bis(hydroxymethyl)octadecanoate, about 28% methyl hydroxymethyl octadecanoate and a small residue of saturated methyl fatty esters. This product had a saponification equivalent weight of 409.8 and a hydroxy equivalent weight of 204.

These hydroxy methyl esters (1 mole by saponification equivalent weight) were reacted with 1.5 moles of 1,4 butane diol by heating for 7 hours at 185° C. with stirring while distilling off the methanol evolved by transesterification. After the reaction was complete the excess diol was removed by heat at 120°–164° C. under a vacuum of 0.2–0.5 mm Hg. Analysis by gas chromatography showed the product to have 0.5% residual 1,4 butane diol and a trace of the starting hydroxymethyl ester.

The equivalent weight of the resultant polyester polyol by hydroxyl analysis was 264.2 and the viscosity was 68 poise at 23° C.

The hydroxyl functionality of the polyester polyol was greater than two.

EXAMPLE 12

To 335.8 grams, 1.0 mole, of $C_{19}HME$ were added 30 grams, 0.5 mole, of freshly distilled ethylene diamine. The reaction was stirred in a vessel equipped with heating source and distillation take-off with a short vigreaux column. At 130° C. distillate began to come over. Over a period of 1.5 hours the pot temperature was increased to 185° C. where it was maintained for 3 hours. It was then raised to 200° C. for an additional hour after which time 28 grams of distillate had been collected. The product was stripped at 70° C. at 1 mm Hg for 1.5 hours.

The resulting hydroxy amide had a softening point of 40° C., a hydroxy equivalent weight of 322 and an amine number of 15. Its viscosity at 50° C. was 17.5 poise.

EXAMPLE 13

Using similar equipment and technique as described in Example 12, 335.8 grams, 1.0 mole, of $C_{19}HME$ was reacted with 97.4 grams, 0.5 mole, of bis(aminomethyl)-tricycloadecane. The reactants were heated at 205° C. for 1 hour, 225° C. for 1 hour and 255° C. for 1.5 hours before stripping at 70° C. under 0.3 mm Hg vacuum for 1 hour. The total distillate collected was 35 grams.

The product was a viscous liquid of 5650 poise at 23° C. and 212 poise at 50° C. The hydroxyl equivalent weight was 408 and the amine number was 15.

EXAMPLE 14

Using similar equipment and technique as in Examples 12 and 13, a hydroxy amide was prepared from $C_{19}HME$ and anhydrous hexamethylene diamine in a molar ratio of 2:1, respectively.

This product had a hydroxyl equivalent weight of 390, an amine number of 6 and a viscosity at 50° C. of 120 poise.

EXAMPLE 15

An amide having both hydroxy and amine functionality was prepared by reacting 1.0 mole of $C_{19}HME$ with 1.0 mole (103.5 grams) of diethylene triamine for 3.5 hours at a temperature starting at 155° C. and ending at 180° C. The reactants were stripped under 4 mm Hg vacuum at 100° C. for 20 minutes.

The product had an amine number of 234 and a viscosity at 23° C. of 67.3 poise.

EXAMPLE 16

An amide having both hydroxyl and amine functionality was prepared by reacting 1.0 mole of $C_{19}HME$ with 1.0 mole (158 grams) of triethylene tetramine in a manner similar to that described in Example 15.

The product had an amine number of 318 and a viscosity at 23° C. of 92.5 poise.

In Examples 17–35, the elastomer properties were determined in accordance with the following elastomer test procedures:

Tensile ultimate strength, ASTM D 412
Percentage Elongation, ASTM D 412
Split Tear, ASTM D 1938
Compression Set, ASTM D 395, Method B, Type 1
Water Absorption, ASTM D 570. 70° C. $H_2O$, 24 hrs
Torsional Rigidity, $T_f$, $T_4$ ASTM D 1043
  $T_f$=temperature at which modulus in torsion reaches 45,000 psi $T_4$ = temperature at which modulus in torsion reaches 3333 psi
Durometer Hardness, ASTM D 2240
Hydrolytic Stability SATRA Method, 14 psi, 120° C. steam

EXAMPLE 17

The polyester polyol of Example 1 was used to prepare a thermoplastic polyurethane elastomer. It was blended with a polyol and reacted with diisocyanate as follows:

|  | Equiv. | Grams |
| --- | --- | --- |
| Polyester polyol | 0.22 | 80.9 |
| Modifying polyol 1,4 butanediol | 0.33 | 14.8 |
| Isonate 143L diisocyanate (a modified diphenylmethane diisocyanate (MDI) containing a high percentage of MDI and a lesser amount of polycarbodiimide adducts) | 0.564 | 82.0 |

The polyols were blended and degassed under vacuum at 70° C. for 90 minutes. After cooling to 30° C. vacuum was released and the diisocyanate was added. While blending under vacuum the exotherm of reaction raised the temperature to 35° C. After 1 minute it was poured into prepared molds and cured for 24 hours at 100° C. After curing the elastomer was conditioned for 7 days at 23° C. and 50% relative humidity.

The elastomer had the following properties:
Shore hardness—55 D
Tensile strength, psi—3850
Elongation, %—240
Split tear, PI—326
Compression set, %—66
Water absorption, 24 hrs at 70° C., %—0.29
Hydrolytic stability, % retained tensile strength—100
Torsional Rigidity
  $T_f$ °C.—−29.5
  $T_4$ °C.—+36

EXAMPLE 18

The polyester polyol of Example 2 was used to prepare a crosslinked polyurethane elastomer. It was blended with polyols and reacted with diisocyanate as follows:

|  | Equiv. | Grams |
| --- | --- | --- |
| Polyester polyol | 0.14 | 64.5 |
| Modifying polyol 1,4 butanediol | 0.12 | 5.2 |
| Modifying polyol $C_{19}$ Diol | 0.15 | 22.5 |
| Crosslinking polyol - $C_{20}$ Triol | 0.10 | 11.4 |
| Isonate 143L diisocyanate | 0.52 | 76.43 |

The polyols were blended and degassed under vacuum at 70° C. for 30 minutes. After cooling to 32° C. vacuum was released and the diisocyanate was added. While blending under vacuum the exotherm of reaction raised the temperature to 70° C. After 4 minutes it was poured into prepared molds and cured for 24 hours at 100° C. After curing the elastomer was conditioned for 7 days at 23° C. and 50% relative humidity.

The elastomer had the following properties:
Shore hardness—54 D
Tensile strength, psi—3425
Elongation, %—145
Split tear, PI—274
Compression set, %—34
Water absorption, 24 hrs at 70° C., %—0.5
Hydrolytic stability % retained tensile strength—94
Torsional Rigidity
  $T_f$ °C.—−25
  $T_4$ °C.—+24

EXAMPLE 19

The polyester polyol of Example 3 was used to prepare a thermoplastic polyurethane elastomer. It was blended with a polyol and reacted with diisocyanate as follows:

|  | Equiv. | Grams |
| --- | --- | --- |
| Polyester polyol | 0.34 | 87.5 |
| Modifying polyol Teracol-1000 (a polyoxytetramethylene glycol of MW near 1000) | 0.06 | 32.5 |
| Isonate 143L diisocyanate | 0.41 | 60.0 |

The polyols were blended and degassed under vacuum at 60° C. for 30 minutes. After cooling to 24° C. vacuum was released and the diisocyanate was added. While blending under vacuum the exotherm of reaction raised the temperature to 72° C. After 15 minutes it was poured into prepared molds and cured for 24 hours at 100° C. Aftering curing the elastomer was conditioned for 7 days at 23° C. and 50% relative humidity.

The elastomer had the following properties:
Shore hardness—90 A
Tensile strength, psi—6020
Elongation, %—285
Split tear, PI—258
Compression set, %—87
Water absorption, 24 hrs at 70° C., %—0.7
Hydrolytic stability, % retained tensile strength—98
Torsional Rigidity
  $T_f$ °C.—−8
  $T_4$ °C.—+17

EXAMPLE 20

The polyester polyol of Example 4 was used to prepare a thermoplastic polyurethane elastomer. It was blended with a polyol and reacted with diisocyanate as follows:

|  | Equiv. | Grams |
| --- | --- | --- |
| Polyester polyol | 0.28 | 84.6 |
| Modifying polyol 1,4 butanediol | 0.28 | 12.4 |
| Isonate 143L diisocyanate | 0.57 | 83.0 |

The polyols were blended and degassed under vacuum at 60° C. for 45 minutes. After cooling to 28° C. vacuum was released and the diisocyanate was added. While blending under vacuum the exotherm of reaction raised the temperature to 70° C. After 4 minutes it was poured into prepared molds and cured for 24 hours at 100° C. After curing the elastomer was conditioned for 7 days at 23° C. and 50% relative humidity.

The elastomer had the following properties:
Shore hardness—57 D
Tensile strength, psi—4161
Elongation, %—165
Split tear, PI—275
Compression set, %—80

Water absorption, 24 hrs at 70° C. %—0.5
Hydrolytic stability, % retained tensile strength—100
Torsional Rigidity
 $T_f$°C.—−9
 $T_4$°C.—+22

EXAMPLE 21

The polyester polyol of Example 5 was used to prepare a crosslinked polyurethane elastomer. It was blended with a polyol and reacted with diisocyanate as follows:

|  | Equiv. | Grams |
| --- | --- | --- |
| Polyester polyol | 0.233 | 100.0 |
| Modifying polyol 1,4 butanediol | 0.233 | 10.5 |
| Isonate 143L diisocyanate | 0.477 | 69.5 |

The polyols were blended and degassed under vacuum at 70° C. for 90 minutes. After cooling to 30° C. vacuum was released and the diisocyanate was added. While blending under vacuum the exotherm of reaction raised the temperature to 50° C. After 4 minutes it was poured into prepared molds and cured for 24 hours at 100° C. After curing the elastomer was conditioned for 7 days at 23° C. and 50% relative humidity.

The elastomer had the following properties:
Shore hardness—94 A
Tensile strength, psi—2420
Elongation, %—120
Split tear, PI—72
Compression set, %—31
Water absorption, 24 hrs at 70° C., %—0.5
Hydrolytic stability, % retained tensile strength 34
Torsional Rigidity
 $T_f$°C.—−22
 $T_4$°C.—+17

EXAMPLE 22

The polyester polyol of Example 6 was used to prepare a crosslinked polyurethane elastomer. It was blended with a polyol and reacted with diisocyanate as follows:

|  | Equiv. | Grams |
| --- | --- | --- |
| Polyester polyol | 0.34 | 53.2 |
| Modifying polyol Teracol-1000 | 0.11 | 59.5 |
| Isonate 143L diisocyanate | 0.46 | 67.3 |

The polyols were blended and degassed under vacuum at 70° C. for 60 minutes. After cooling to 40° C. vacuum was released and the diisocyanate was added. While blending under vacuum the exotherm of reaction raised the temperature to 66° C. After 5 minutes it was poured into prepared molds and cured for 24 hours at 100° C. After curing the elastomer was conditioned for 7 days at 23° C. and 50% relative humidity.

The elastomer had the following properties:
Shore hardness—93 A
Tensile strength, psi—2966
Elongation, %—110
Split tear, PI—83
Compression set, %—21
Water absorption, 24 hrs at 70° C., %—1.5
Hydrolytic stability, % retained tensile strength—62
Torsional Rigidity
 $T_f$°C.—−7
 $T_4$°C.—+21

EXAMPLE 23

The polyester polyol of Example 7 was used to prepare a crosslinked polyurethane elastomer. It was blended with a polyol and reacted with diisocyanate as follows:

|  | Equiv. | Grams |
| --- | --- | --- |
| Polyester polyol | 0.37 | 81.2 |
| Modifying polyol Teracol-1000 | 0.062 | 33.2 |
| Isonate 143L diisocyanate | 0.45 | 65.6 |

The polyols were blended and degassed under vacuum at 70° C. for 60 minutes. After cooling to 43° C. vacuum was released and the diisocyanate was added. While blending under vacuum the exotherm of reaction raised the temperature to 68° C. After 5 minutes it was poured into prepared molds and cured for 23 hours at 100° C. After curing the elastomer was conditioned for 7 days at 23° C. and 50% relative humidity.

The elastomer had the following properties:
Shore hardness—53 D
Tensile strength psi—1813
Elongation, %—60
Split tear, PI—46
Compression set, %—19
Water absorption, 24 hrs at 70° C., %—1.0
Hydrolytic stability, % retained tensile strength—70
Torsional Rigidity
 $T_f$°C.—−26
 $T_4$°C.—+26

EXAMPLE 24

The polyester polyol of Example 8 was used to prepare a crosslinked polyurethane elastomer. It was reacted with diisocyanate as follows:

|  | Equiv. | Grams |
| --- | --- | --- |
| Polyester polyol | 0.40 | 119.1 |
| Isonate 143L diisocyanate | 0.41 | 60.9 |

The polyol was degassed under vacuum at 70° C. for 60 minutes. After cooling to 39° C. vacuum was released and the diisocyanate was added. While blending under vacuum the exotherm of reaction raised the temperature to 73° C. After 7 minutes it was poured into prepared molds and cured for 23 hours at 100° C. After curing the elastomer was conditioned for 7 days at 23° C. and 50% relative humidity.

The elastomer had the following properties:
Shore hardness—53 D
Tensile strength, psi—1560
Elongation, %—50
Split tear, PI—50
Compression set, %—10
Water absorption, 24 hrs at 70° C., %—0.5
Hydrolytic stability, % retained tensile strength—82
Torsional Rigidity
 $T_f$°C.—−37
 $T_4$°C.—+23

EXAMPLE 25

The polyester polyol of Example 9 was used to prepare a crosslinked polyurethane elastomer. It was blended with a polyol and reacted with diisocyanate as follows:

|  | Equiv. | Grams |
|---|---|---|
| Polyester polyol | 0.30 | 110.8 |
| Modifying polyol 1,4 butanediol | 0.12 | 5.5 |
| Isonate 143L diisocyanate | 0.43 | 63.8 |

The polyols were blended and degassed under vacuum at 70° C. for 60 minutes. After cooling to 42° C. vacuum was released and the diisocyanate was added. While blending under vacuum the exotherm of reaction raised the temperature to 70° C. After 4 minutes it was poured into prepared molds and cured for 24 hours at 100° C. After curing the elastomer was conditioned for 7 days at 23° C. and 50% relative humidity.

The elastomer had the following properties:
Shore hardness—94 A
Tensile strength, psi—1440
Elongation, %—55
Split tear, PI—41
Compression set, %—23
Water absorption, 24 hrs at 70° C., %—0.5
Hydrolytic stability, % retained tensile strength—84
Torsional Rigidity
  $T_f$ °C.— −37
  $T_4$ °C.— +17

EXAMPLE 26

The polyester polyol of Example 10 was used to prepare a crosslinked polyurethane elastomer. It was blended with a polyol and reacted with diisocyanate as follows:

|  | Equiv. | Grams |
|---|---|---|
| Polyester polyol | 0.25 | 110.0 |
| Modifying polyol 1,4 butanediol | 0.16 | 7.5 |
| Isonate 143L diisocyanate | 0.43 | 62.0 |

The polyols were blended and degassed under vacuum at 70° C. for 90 minutes. After cooling to 30° C. vacuum was released and the diisocyanate was added. While blending under vacuum the exotherm of reaction raised the temperature to 50° C. After 8 minutes it was poured into prepared molds and cured for 24 hours at 100° C. After curing the elastomer was conditioned for 7 days at 23° C. and 50% relative humidity.

The elastomer had the following properties:
Shore hardness—93 A
Tensile strength, psi—1480
Elongation, %—75
Split tear, PI—44
Compression set, %—12
Water absorption, 24 hrs at 70° C., %—0.5
Hydrolytic stability, % retained tensile strength—70
Torsional Rigidity
  $T_f$ °C.— −34
  $T_4$ °C.— +15

EXAMPLE 27

The polyester polyol of Example 11 was used to prepare a crosslinked polyurethane elastomer. It was blended with a polyol and reacted with diisocyanate as follows:

|  | Equiv. | Grams |
|---|---|---|
| Polyester polyol | 0.22 | 59.4 |
| Modifying polyol Teracol-1000 | 0.025 | 12.3 |
| Isonate 143L diisocyanate | 0.25 | 37.2 |

The polyols were blended and degassed under vacuum at 70° C. for 90 minutes. The vacuum was broken with $N_2$ and the product was cooled to room temperature. The diisocyanate was then added. After degassing under vacuum for 3 minutes, the reaction mixture was poured into prepared molds at a temperature of 35° C. It set 10 minutes after pouring and was cured overnight at 100° C. Aftering curing, the elastomer was conditioned for 7 days at 23° C. and 50% relative humidity before testing.

The properties of the polyurethane elastomer were as follows:
Tensile strength, psi—1871
Elongation, %—75
Split tear, PI—103
Water absorption, 24 hrs at 70° C., %—0.8
Hydrolytic stability, % retained tensile strength—100
Torsional Rigidity
  $T_f$ °C.— −11
  $T_4$ °C.— +14

EXAMPLE 28

The amide diol of Example 12 was reacted with isophorone diisocyanate (IPDI) using 73 wt. % of the diol to 27 wt. % of the isocyanate plus 0.017% of dibutyltin dilaurate (DBTDL) as catalyst. The amide diol was heated with stirring to 70° C. under $N_2$ for 15 minutes then degassed under vacuum for 80 minutes. The IPDI was then added after cooling to 50° C. and vacuum pulled for 3 minutes at which time the temperature had increased to 70° C. The partially reacted mixture was poured into molds and cured at 100° C. for 24 hours.

The polyurethane elastomer thus produced had the following properties:
Shore hardness—89 A
Tensile strength, psi—1111
Elongation, %—355
Split tear, PI—134
Compression set, %—45
Water absorption 24 hrs at 70° C., %—2.0
Hydrolytic stability, % retained tensile strength—100
Torsional Rigidity
  $T_f$ °C.— −26
  $T_4$ °C.— +13

EXAMPLE 29

Using substantially the same technique described in Example 28, the $C_{19}$HME/ethylene diamine amide diol of Example 12 was blended with two modifying polyols, degassed and reacted with isophorone diisocyanate (IPDI) in the presence of dibutyltin dilaurate (DBTDL) catalyst in the following ratio:

|  | Equiv. | Grams |
|---|---|---|
| ($C_{19}$HME)$_2$EDA | 0.27 | 86.2 |
| Hydroxymethyloctadecanol | 0.15 | 23.2 |
| Bis(hydroxymethyl)octadecanol | 0.10 | 11.7 |
| IPDI | 0.54 | 58.8 |
| DBTDL |  | 0.03 |

The polyurethane elastomer had the following properties:
Shore hardness—65 D
Tensile strength, psi—5162
Elongation, %—275
Split tear, PI—447
Compression set, %—30
Water absorption, 24 hrs at 70° C., %—1.7
Hydrolytic stability, % retained tensile strength—81
Torsional Rigidity
$T_f$ °C.— −9
$T_4$ °C.— +29

EXAMPLE 30

Using substantially the same technique as described in Example 28, the $C_{19}$HME/bis(aminomethyl)tricyclodecane amide diol of Example 13 was blended with three modifying polyols, degassed and reacted with isophorone diisocyanate in the presence of dibutyltin dilaurate in the following ratio:

|  | Equiv. | Grams |
| --- | --- | --- |
| ($C_{19}$HME) BAMTCD | 0.15 | 61.3 |
| Teracol-1000 | 0.075 | 39.9 |
| Hydroxymethyl octadecanol | 0.13 | 19.5 |
| Bis(hydroxymethyl)octadecanol | 0.086 | 5.4 |
| IPDI | 0.45 | 49.5 |
| DBTDL |  | 0.0312 |

This polyurethane elastomer had the following properties:
Shore hardness—88 A
Tensile strength, psi—2806
Elongation, %—365
Split tear, PI—154
Compression set, %—12
Water absorption, 24 hrs at 70° C., %—1.4
Hydrolytic stability, % retained tensile strength—68
Torsional Rigidity
$T_f$ °C.— −29
$T_4$ °C.— +12

EXAMPLE 31

Using substantially the same technique described in Example 28, the $C_{19}$HME/hexamethylene diamine amide diol of Example 14 was blended with two copolyols, degassed and reacted with isophorone diisocyanate in the presence of dibutyltin dilaurate in the following ratio:

|  | Equiv. | Grams |
| --- | --- | --- |
| ($C_{19}$HME)$_2$HMDA | 0.24 | 94.9 |
| Hydroxymethyl octadecanol | 0.14 | 21.1 |
| Bis(hydroxymethyl)octadecanol | 0.092 | 10.6 |
| IPDI | 0.49 | 53.4 |
| DBTDL |  | 0.06 |

This polyurethane elastomer had the following properties:
Shore hardness—93 A
Tensile strength psi—1090
Elongation, %—330
Torsional Rigidity
$T_f$ °C.— −10
$T_4$ °C.— +15

EXAMPLE 32

It is generally preferred to prepare the polyester polyols of the invention with an excess of polyol reactant as exemplified by this Example.

1.0 mole of $C_{19}$HME and 5.0 moles of urethane grade 1,4-butanediol plus butyltin tris(2-ethylhexoate) at 50 ppm Sn per $C_{19}$HME were heated and stirred in a reactor fitted with a short vigreaux column. At 200° C. methanol began to evolve and continued to evolve for 1.5 hours while the temperature in the pot rose to 220° C. A sample of the reaction mixture was taken and analyzed by gas chromotography indicating that essentially all of the $C_{19}$HME had reacted. The product was stripped under 0.2 mm Hg vacuum at 108°–120° C. until all excess 1,4-butanediol was removed. A 1/1 ester diol of the formula:

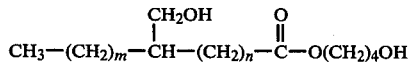

where m is 8 or 7 and n is 7 or 8, respectively was obtained in high yield together with a small amount of 2/1 diester diol of the formula:

where m is 8 or 7 and n is 7 or 8, respectively.

This product had a hydroxyl equivalent weight of 214 and a viscosity of 3.7 poise at 23° C.

EXAMPLE 33

An ester diol made as described in Example 32 was blended with modifying polyols and reacted with modified diphenyl methane diisocyanate (Isonate 143L) according to the following ratio:

|  | Equiv. | Grams |
| --- | --- | --- |
| ($C_{19}$HME)BD | 0.172 | 66.39 |
| Hydroxymethyl octadecanol | 0.147 | 22.41 |
| Bis(hydroxymethyl)octadecanol | 0.098 | 11.30 |
| Isonate 143L | 0.517 | 76.0 |

The polyols were degassed under vacuum at 65° C. for 2.5 hours. The diisocyanate was added, the reactants degassed 4 minutes under vacuum and then poured into molds and cured 24 hours at 100° C.

After conditioning six days at 23° C. and 50% relative humidity, the polyurethane elastomer had the following properties:
Shore hardness—56 D
Tensile strength, psi—3579
Elongation, %—160
Split tear, PI—241
Compression set, %—21
Water absorption, 24 hrs at 70° C., %—0.2
Hydrolytic stability, % retained tensile strength—100
Torsional Rigidity
$T_f$ °C.— −8
$T_4$ °C.— +25

EXAMPLE 34

To 601.78 grams of Sunlite brand sunflower oil were added 2.96 grams of catalyst (5% Rh on C) and 3.44 grams of tris(3-diethylaminopropyl) phosphine. The materials were purged with $N_2$ and $H_2$ and reacted with $H_2$/CO for 5¾ hours at 16° C.→123° C. under 1200–1265 psi gas pressure. The catalyst was extracted with Amberlyst 15 in tetrahydrofuran and filtered.

The hydroformylated sunflower oil was hydrogenated using a nickel catalyst at 140°–150° C., 890–910 psi, for three hours. The polyhydroxymethyl sunflower oil which resulted had a hydroxyl equivalent weight of 276.2

To 99.2 grams (0.359 equivalents) of the polyhydroxymethyl sunflower oil was added 23.5 grams (0.024 equivalents) of Teracol 2000 (polyoxytetramethylene glycol) as a co-polyol. These were degassed by stirring under vacuum at 70° C. for 30 minutes. To the degassed polyol mixture was added 57.2 grams (0.393 equivalents) of Isonate 143L. This blend of reactants were stirred under vacuum for 3 minutes at 40° C. and poured into prepared molds and cured for 24 hours at 110° C. It required 8 minutes to become solid at this temperature.

The polyrethane elastomer so produced had the following properties:
Shore hardness—55 D
Tensile strength, psi—1192
Elongation, %—55
Split tear, PI—83
Compression set, %—66
Water absorption, 24 hrs at 70° C., %—0.76
Hydrolytic stability, % retained tensile strength—94
Torsional Rigidity
  $T_f$°C.——10
  $T_4$°C.—+19

EXAMPLE 35

To 117 grams (0.42 equivalents) of the polyhydroxymethyl sunflower oil were added 63 grams, 0.43 equivalents of Isonate 143L and the reactants stirred 2 minutes under vacuum at 40° C. before being poured into molds and curing 24 hours at 110° C. The gel time on this product was 5 minutes.

The polyurethane elastomer so produced had the following properties:
Shore hardness—72 D
Tensile strength, psi—3738
Elongation, %—20
Split tear, PI—177
Compression set, %—8.1
Water absorption, 24 hrs at 70° C., %—0.49
Hydrolytic stability, % retained tensile strength—78
Torsional Rigidity
  $T_f$°C.——21
  $T_4$°C.—+36

From the foregoing detailed description and Examples, it should be apparent that the invention encompasses a wide range of polyurethane compounds. It should also be apparent that while the invention has been described in terms of various preferred embodiments, and exemplified with respect thereto, those of skill in the art will readily appreciate that various modifications, changes, omissions, and substitutions may be made without departing from the spirit of the invention. It is therefore intended that the present invention be limited solely by the scope of the following claims.

We claim:

1. Urethane linked reaction products of at least one non-gelled polyol of the formula:

where
R is a polyol, polyamine or aminoalcohol residue;
X may be the same or different and is O, N or NH;
p is an integer from 2 to 6; and,
A may be the same or different and is selected from the group consisting of $A_1$, $A_2$ and $A_3$ and combinations of $A_1$, $A_2$ and $A_3$, where

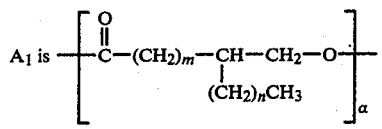

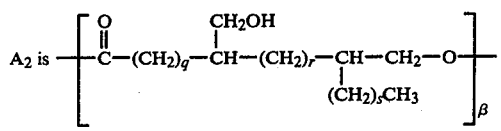

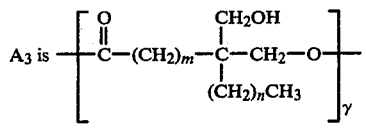

where m, n, q, r, s, $\alpha$, $\beta$ and $\gamma$ are integers and where
m > 3
n ≧ 0 and
m+n is from 11 to 19
q > 3
r ≧ 0
s ≧ 0 and
q+r+s is from 10 to 18
$\alpha$ is from 0 to 10
$\beta$ is from 0 to 10 and
$\gamma$ is from 1 to 10, except that all $\alpha$'s, $\beta$'s and $\gamma$'s in any given compound are not all zero;
and from about 80% to about 120% on a hydroxy-isocyanate equivalent basis of at least one polyisocyanate.

2. The compounds of claim 1, wherein in the formula for said polyol, X is oxygen, p is 2 and R is a diol residue.

3. Urethane linked reaction products of at least one non-gelled polyol of the formula:

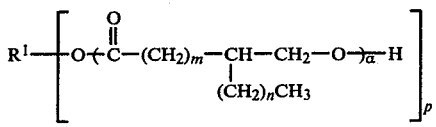

where
$R^1$ is a polyol residue;
p is an integer from 2 to 6
$\alpha$ is an integer from 0 to 10 and may be the same or different in each bracketed moiety of the formula, except that all $\alpha$'s are not all zero;
m and n are integers
where m>3
n≧0 and
m+n is from 11 to 19;
and from about 80% to about 120% on a hydroxy-isocyanate equivalent basis of at least one polyisocyanate.

4. The compounds of claim 3, wherein in the formula for said polyol, p is 2 and $R^1$ is a diol residue.

5. The compounds of claim 2 or 4, wherein the diol is 1,4-butanediol.

6. The compounds of claim 2 or 4, wherein the diol is

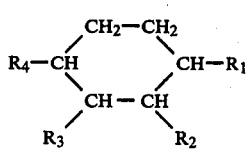

wherein $R_1$, $R_2$, $R_3$ and $R_4$ have a total of from 30 to 38 carbon atoms and are each straight-chained alkyl groups having at least 5 carbon atoms, and wherein two of these alkyl groups have omega-hydroxyl substituents.

7. The compounds of claim 2 or 4, wherein the diol is ethylene glycol.

8. The compounds of claim 2 or 4, wherein the diol is neopentylglycol.

9. The compounds of claim 2 or 4, wherein the diol is a compound of the formula

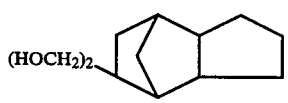

(IA)

and

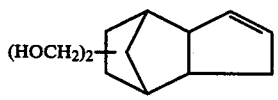

(IB)

and mixtures thereof.

10. The compounds of claim 9 wherein the tricyclo compound is 8,8(9,9)-bis(hydroxymethyl)tricyclo[5,2,1,0$^{2,6}$] dec-3-ene.

11. The compounds of claim 9 wherein the tricyclo compound is 8,8-bis(hydroxymethyl)tricyclo[5,2,1,0$^{2,6}$] decane.

12. The compounds of claim 2 or 4, wherein the diol is

wherein k is 3 or greater; and h plus k are non-zero integers the sum of which is from 12 through 20.

13. The compounds of claim 12 wherein the diol is 9(10)-hydroxymethyloctadecanol.

14. The compounds of claim 2 or 4, wherein the diol is 1,4-bishydroxymethylcyclohexane.

15. The compounds of claim 2 or 4, wherein the diol is a member selected from the group consisting of 3(4), 8(9)-(bishydroxymethyl)-tricyclo[5,2,1,0$^{2,6}$] decane.

16. The compounds of claim 1, wherein X is oxygen and R is a triol residue.

17. The compounds of claim 3, wherein $R^1$ is a triol residue.

18. The compounds of claim 16 or 17, wherein the triol is trimethylolpropane.

19. The compounds of claim 1, wherein X is oxygen and R is a tetrol residue.

20. The compounds of claim 3, wherein $R^1$ is a tetrol residue.

21. The compounds of claim 19 or 20, wherein the tetrol is pentaerythritol.

22. The compounds of claims 1 and 3 wherein R or $R^1$ is derived from a polyol of the formula:

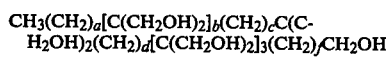

and mixtures thereof, wherein b and e are 0 or 1;
a and f are 3 or greater;
c and d are non-zero integers; and
a+b+c+d+e+f is from 11 to 19.

23. The compounds of claim 22, wherein the polyol includes a diol of the formula:

wherein k is 3 or greater and h+k is from 12 to 20.

24. The compounds of claim 22, wherein the polyol is 9,9 (10,10)-bishydroxymethyloctadecanol.

25. The compounds of claim 1, wherein x is O and R is a polyol residue derived from a polyol of the formula:

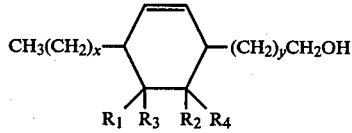

and

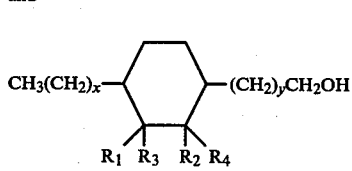

and mixtures thereof wherein $R_1$ and $R_2$ are selected from the group consisting of hydrogen and methyl and mixtures thereof with the provision that one such member must be hydrogen; and $R_3$ and $R_4$ are hydrogen or hydroxymethyl provided that at least one of $R_3$ and $R_4$ must be hydroxymethyl; and urther that x is an integer of from 3 through 6 and y is an integer from 6 through 9 and that the sum x+y is 12.

26. The compounds of claim 3, wherein $R^1$ is a polyol residue derived from a polyol of the formula:

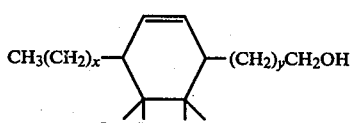

and

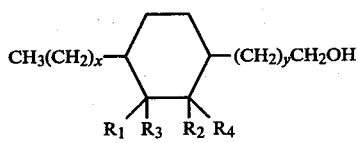

and mixtures thereof wherein $R_1$ and $R_2$ are selected from the group consisting of hydrogen and methyl and mixtures thereof with the provision that one such member must be hydrogen; and $R_3$ and $R_4$ are hydrogen or hydroxymethyl provided that at least one of $R_3$ and $R_4$ must be hydroxymethyl; and further that x is an integer of from 3 through 6 and y is an integer from 6 through 9 and that the sum x+y is 12.

27. The compounds of claim 1, wherein X is oxygen and R is a polyol residue derived from a polyether polyol.

28. The compounds of claim 3, wherein $R^1$ is a polyol residue derived from a polyether polyol.

29. The compounds of claim 27 or 28, wherein the polyether polyol is derived by reacting a polyol with at least one mole of alkylene oxide per mole of hydroxyl on the polyol.

30. The compounds of claim 29, wherein the alkylene oxide is selected from the group consisting of ethylene oxide, propylene oxide and mixtures thereof.

31. The compounds of claim 29, wherein the polyol contains from 2 to 10 moles alkylene oxide per mole of hydroxyl on the polyol.

32. The compounds of claim 29, wherein the polyol is a diol.

33. The compounds of claim 26, wherein the diol is selected from the group consisting of neopentyl glycol, ethylene glycol, 1,4-butanediol hydroxymethyloctadecanol and cyclohexane dimethanol.

34. The compounds of claim 1 or 3, wherein m is 7 and n is 8.

35. The compounds of claim 1 or 3, wherein m is 8 and n is 7.

36. The compounds of claim 1, wherein X is N or NH and R is a polyamine residue.

37. The compounds of claim 36, wherein p is 2 and R is a diamine residue.

38. The compounds of claim 37, wherein said diamine is selected from the group consisting of ethylene diamine, 1,6-diaminohexane, neopentyldiamine, bisaminomethyltricyclodecane and bis-aminocyclohexane.

39. The compounds of claim 36, wherein p is 3 and R is a triamine residue.

40. The compounds of claim 39, wherein said triamine is diethylene triamine.

41. The compounds of claim 36, wherein p is 4 and R is a tetramine residue.

42. The compounds of claim 41, wherein said tetramine is triethylene tetramine.

43. The compounds of claim 1, wherein R is an aminoalcohol residue.

44. The compounds of claim 43, wherein said aminoalcohol is selected from the group consisting of ethanolamine, diethanolamine and triethanolamine.

45. The compounds of claim 1 or 3, wherein the polyisocyanate is present at from about 95% to about 105% on a hydroxyl-isocyanate equivalent basis.

46. The compounds of claim 1 or 3, wherein the polyisocyanate is selected from the group consisting of diisocyanates, triisocyanates and mixtures thereof.

47. The compounds of claim 1 or 3, wherein the polyisocyanate is an aromatic isocyanate.

48. The compounds of claim 1 or 3, wherein the polyisocyanate is an aliphatic or cycloaliphatic isocyanate.

49. The compounds of claim 1 or 3, wherein the polyisocyanate is selected from the group consisting of toluene diisocyanate, xylene diisocyanate, isophorone diisocyanate, hexamethylene diisocyanate, the triisocyanate adduct of hexamethylene diisocyanate and water, trimethyl hexamethylene diisocyanate, diphenylmethane diisocyanate, aliphatic diisocyanates having 12 to 40 carbon atoms in the aliphatic moiety and mixtures thereof.

50. The compounds of claim 1 or 3, wherein said reaction product is formed from at least one of said polyols, at least one of said polyisocyanates and at least one modifying polyol.

51. The compounds of claim 50, wherein said modifying polyol is selected from the group consisting of alkyl and cycloalkyl polyols, ester linked polyols, ether linked polyols, ether and ester linked polyols and hydroxy functional acrylic copolymers.

52. The compounds of claim 1 or 3, further comprising modifying agents selected from the group consisting of fillers, dyes, and plasticizers.

53. An elastomer formed from a urethane linked reaction product of claim 1 or 3.

54. A microcellular foam formed from a urethane linked reaction product of claim 1 or 3.

55. A protective coating formed from a urethane linked reaction product of claim 1 or 3.

56. An adhesive formed from the urethane linked reaction product of claim 1 or 3.

* * * * *